(No Model.)

I. JACKSON.
BELT FASTENER.

No. 538,332. Patented Apr. 30, 1895.

Witnesses
W. H. Bentley.
Gales P. Moore.

Inventor
Isaac Jackson
By Geo. P. Whitney
Atty.

THE NORRIS PETERS CO., PHOTO-LITHO., WASHINGTON, D. C.

UNITED STATES PATENT OFFICE.

ISAAC JACKSON, OF GLOSSOP, ENGLAND.

BELT-FASTENER.

SPECIFICATION forming part of Letters Patent No. 538,332, dated April 30, 1895.

Application filed November 16, 1893. Serial No. 491,123. (No model.) Patented in England December 9, 1892, No. 22,599.

*To all whom it may concern:*

Be it known that I, ISAAC JACKSON, a citizen of the United Kingdom of Great Britain and Ireland, residing at Glossop, in the county of Derby, England, have invented certain new and useful Improvements in Belt-Fasteners, (patented in Great Britain December 9, 1892, No. 22,599,) of which the following is a specification.

The objects of this invention, which relates to belt fasteners, are to enable the fasteners to be easily applied, to diminish thickening of the joints, and the projection of the fastening devices from the surface of the belt, and to enable belts provided with the improved fasteners to run more smoothly over pulleys.

The fastener is especially adapted to uniting the contiguous edges of narrow belts to form a wide one.

Figure 1:
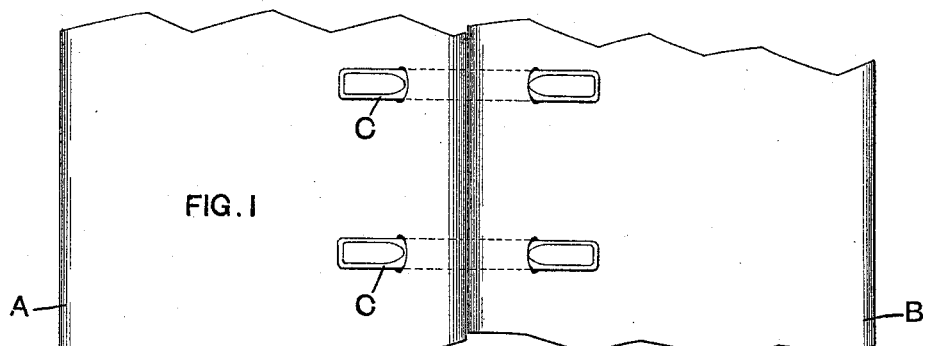
Figure 2:
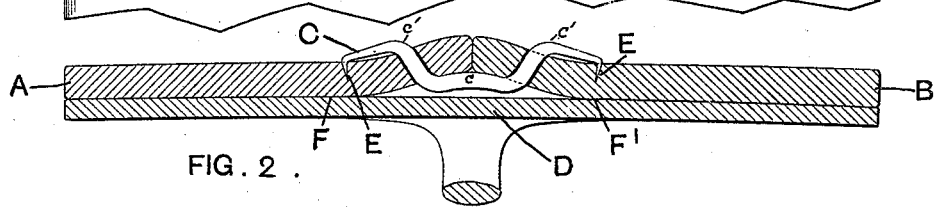
Figure 3:
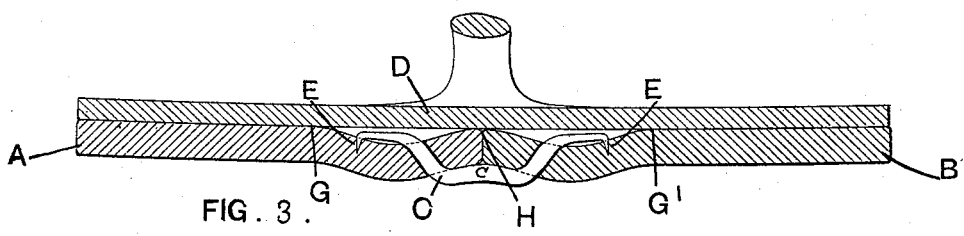
Figure 4:
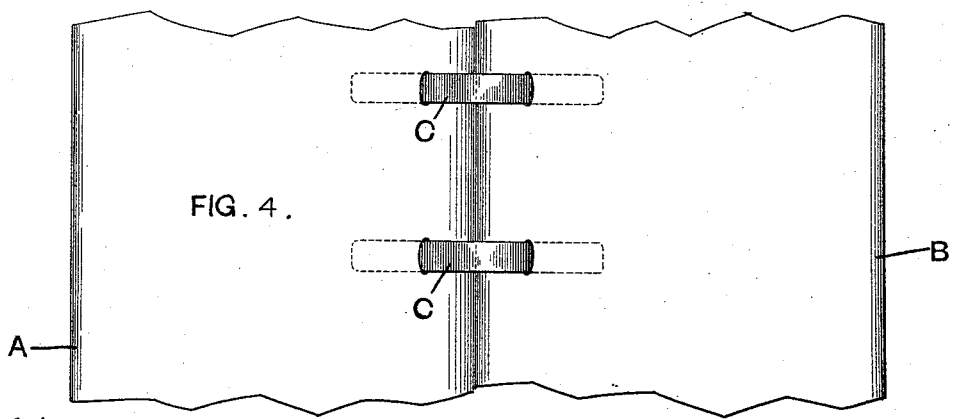

In the accompanying drawings, Figure 1 is a plan view of a portion of a belt provided with my improved fastener. Fig. 2 is a sectional view of the same, showing a portion of the pulley. Fig. 3 is a similar view, showing the operation of the belt on an idle or tightening pulley. Fig. 4 is a plan view of the reverse side of the belt seen in Fig. 1.

The two portions A B of a belt are brought together, and the fasteners C are applied thereto in such a manner as to hold the abutting edges in contact and somewhat above the rest of the belt. This is due to the peculiar shape of the fastener, which has middle portion $c$ arched upwardly, that is, away from the under side of the belt, while at each end of the arched portion is an arm $c'$ running upwardly and outwardly at nearly a right angle to the middle portion $c$ and on the convex side thereof. These arms $c'$ pass through the belt, and their upper portions are bent outwardly at nearly a right angle at the point where the arms emerge from the belt. These upper portions are flattened so as to possess some springiness. The tip E of each arm is bent sharply downward, and is pointed so as to enter the belt. Owing to its form, the fastener does not come in contact with the pulley D, but is raised from it, leaving a clear space out of contact with the pulley between the points F and F'. Fig. 3 shows the same belt and fastener in contact with a tightening or idle pulley, the opposite side of the belt being in contact with the pulley to that shown in contact in the preceding figures. The fastener, which is capable of a certain amount of flexure or springiness, allows the edges of the belts to run in contact with the pulley between the points G and G'.

Having thus described my invention, what I claim is—

A belt fastener consisting of a piece of wire C having an arched middle portion $c$, and arms $c'$ extending up at an angle with said arched portion and on the convex side thereof, the upper portions of said arms being bent outwardly at nearly a right angle and flattened, and provided with hooks E at their extremities, substantially as described.

In testimony that I claim the foregoing as my invention I have signed my name, in the ence of two witnesses, this 21st day of July, 1893.

ISAAC JACKSON.

Witnesses:
WILLIAM E. HEYS,
ARTHUR H. PULMAN.